United States Patent [19]
Kuzuya et al.

[11] 3,894,914
[45] July 15, 1975

[54] DETERMINATION OF MONOAMINE OXIDASE ACTIVITY

[75] Inventors: Yukihiro Kuzuya; Yoshitsugu Sakata, both of Takatsuki; Masako Takeda, Suita; Hisahiko Shimada, Ashiya, all of Japan

[73] Assignee: Wako Pure Chemical Industries, Ltd., Osaka, Japan

[22] Filed: Apr. 16, 1973

[21] Appl. No.: 351,642

[30] Foreign Application Priority Data
Apr. 27, 1973  Japan................................. 48-23521
Apr. 19, 1972  Japan................................. 47-38668

[52] U.S. Cl..................... 195/103.5 R; 195/103.5 R
[51] Int. Cl...... C12k 1/04; C07g 7/02; C12d 13/10
[58] Field of Search................. 195/103.5; 23/230 B

[56] References Cited
UNITED STATES PATENTS
3,715,325  2/1973  Linoli et al............... 195/103.5 R X

*Primary Examiner*—David M. Naff
*Attorney, Agent, or Firm*—Armstrong, Nikaido & Wegner

[57] ABSTRACT

A method for determining the enzymatic activity of monoamine oxidase contained in an organism sample by reacting enzymatically a benzylaminoazo derivative or its acid addition salt with the organism sample, separating the resulting benzaldehydeazo derivative from the reaction mixture and determining an optical absorbance of the benzaldehydeazo derivative at a wave length within the visible region of the absorption spectrum.

34 Claims, No Drawings

DETERMINATION OF MONOAMINE OXIDASE ACTIVITY

The present invention relates to a method for determining the enzymatic activity of monoamine oxidase (hereinafter referred to as "MAO"). More particularly, the present invention relates to a novel method for determining the enzymatic activity of MAO contained in organism tissue by an optical method.

MAO is an enzyme which takes part in the methabolism of amines in the organism and catalyzes the oxidative deamination reaction of the amines according to the following reaction equation,

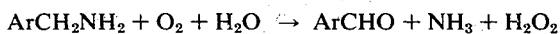

$$ArCH_2NH_2 + O_2 + H_2O \rightarrow ArCHO + NH_3 + H_2O_2$$

wherein Ar stands for a phenyl group or a substituted phenyl group.

According to recent studies on the MAO, it has been reported that MAO shows abnormal activity levels in most cases of hepatic cirrhosis, and in some cases of chronic heart failure, diabetes mellitus or hyperthyroidism.

Heretofore, in the clinical examination of the liver there have been used a needle biopsy or needle biopsy under the laparoscopic observation as a method for detecting exactly the fibrosis in the liver. However, much cannot be expected of these examination methods because of the restriction in the amount of available observation materials or difficulty in frequent collection of the organism sample. As an effective alternative means, there have been made an attempt to determine chemical substances or the activity of the enzymes which take part in the metabolism of these chemical substances in the humors such as serum or urine or in a connective tissue in order to find the condition of diseases and, as a result of determinations in a large number of cases, it has been concluded that the determination of MAO activity in blood is an effective adjuvant diagnostic method in liver fibrosis. (Ken-ich Ito et al, "Saikin Igaku" Vol. 25, No. 11, page 2342, (1970)).

Heretofore, as a method for determining MAO activity in an organism sample, there has been proposed a method in which a chemical substance formed in the reaction of MAO-containing organism sample is determined using benzylamine as a substrate. For example, Charles M. McEwen, Journal of Biological Chemistry, Vol. 240, pages 2003 – 2010, (1965) teaches a method in which the ultraviolet absorption spectrum of benzaldehyde is determined spectrophotometrically, that is, absorbance at 250 nm (nm = nanometer, $10^{-9}$ m) is determined, to find the amount of benzaldehyde formed and thereby find MAO activity in the sample. However, since the determination of ultraviolet absorption spectrum is disturbed by other materials contained in the sample showing an absorption in ultraviolet region, e.g., protein, nucleic acids, bilirubin and vitamines, and troublesome in operation in that a blank test of the sample should be carried out at each determination the propagation of this diagnostic method into common laboratories has not been smooth.

Though a colorimetric method for the determination of benzaldehyde formed with suitable detecting reagents has also been attempted, an exact determination value could not be obtained and hence it is not a satisfactory method.

Still further, the fact that a relatively long period of time was required in the enzymatic reaction itself using benzylamine as a substrate was another drawback of aforesaid determination method.

A method in which another product, ammonia, is determined is disturbed by ammonia and volatile amines which are originally contained in the sample and the exact determination of MAO activity cannot be accomplished by this method.

Still further, a method in which hydrogen peroxide formed is determined with both catalase and a reactive color to obtain MAO activity is unlikely to give an exact result because the reactive color changes during the determining operation, becoming the causes of the errors.

Since MAO consumes oxygen in the aforesaid enzymatic reaction, there is also a method which comprises determining the amount of oxygen consumed with a manometer. However, this method is not applicable to clinical tests using a minute amount of an organism sample because of low sensitivity. Thus, all the previous methods for the determination of MAO activity had many drawbacks making these methods unapplicable.

An object of the present invention is to provide a method for determining exactly and readily MAO activity by determining the enzymatic reaction product from the visible absorption spectrum.

Another object of the present invention is to shorten the time required for the enzymatic reaction.

A further object of the present invention is to provide a practical method for determining MAO activity in laboratories.

According to the present invention, there is provided a method for determining the enzymatic activity of MAO contained in an organism sample which comprises reacting enzymatically a substrate solution containing as the substrate benzylaminoazo derivatives represented by the formula,

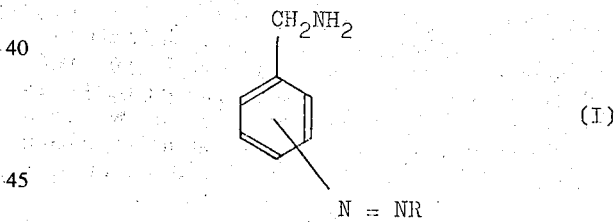

wherein R stands for a group capable of forming a chromophore together with the adjacent —N=N— group, or its acid addition salt, with the organism sample, separating from the reaction mixture the resulting benzaldehydeazo derivative represented by the formula,

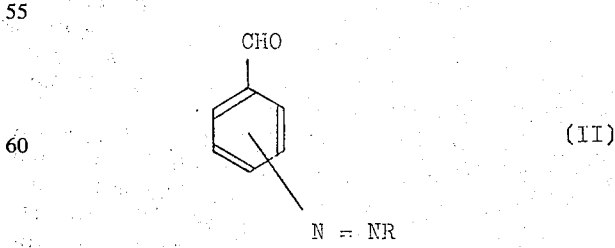

wherein R is as defined above, and determining an optical absorbance of the benzaldehydeazo derivative at a suitable wave length.

Thus, the present invention provides a method for determining benzaldehydeazo derivative which is formed by the following enzymatic reaction by means of a colorimeter, a spectrophotometer or a visual inspection,

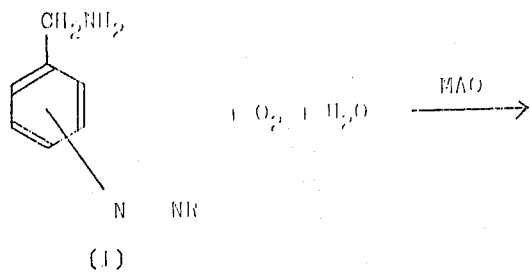

(I)

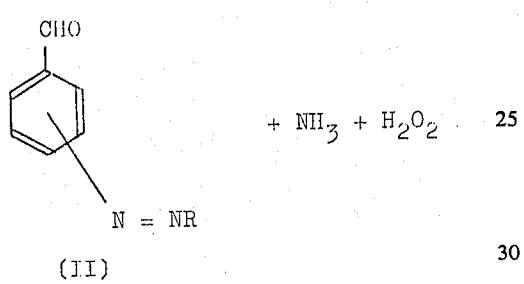

+ $NH_3$ + $H_2O_2$ (II)

wherein R is as defined above.

Examples of R in the general formula (I) representing benzylaminoazo derivatives which are employed as substrates in the present invention include an unsubstituted phenyl group; an unsubstituted naphthyl group or a substituted phenyl or substituted naphthyl group. The examples of the substituents of the said phenyl or naphthyl group are a hydroxyl group, an amino group, a carboxyl group, a lower alkyl group, a mono-lower alkylamino group, a di-lower alkylamino group and a halogen atom. The symbol R may be also a pyrazolone group represented by the general formula,

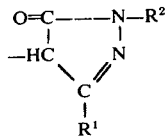

wherein both $R^1$ and $R^2$ stand for a hydrogen atom, an alkyl group, a substituted alkyl group, a cycloalkyl group, a substituted cycloalkyl group, an aralkyl group, a substituted aralkyl group, a phenyl group or a substituted phenyl group, independently.

Said benzylaminoazo derivatives (I) are believed to be novel compounds not described in the literature and all of them show characteristic absorption peaks in the visible region. These benzylaminoazo derivatives (I) are prepared by diazotizing aminobenzylamine (or aminobenzylamine protected by the group readily removable from the benzylamino group) according to a conventional method to form a diazo compound and subsequently reacting the diazo compound with a coupling component corresponding to the substituent R. The structures of these benzylaminoazo derivatives are illustrated and the physical properties thereof are shown in Table 1 as follows.

Table 1-1

| Substrate compound | | Yield (%) | Melting point (°C) | λmax in water (nm) |
|---|---|---|---|---|
| X | OH–⌬(OH) | 60 | 275–277 | 384 |
| Y | OH–⌬(OH) | 55 | >300 | 374 |
| Z | OH–⌬(OH) | 50 | >300 | 370 |
| X | OH–⌬(CH₃,CH₃) | 61 | 216–218 | 357 |
| Y | OH–⌬(CH₃,CH₃) | 78 | 218–219 | 356 |
| X | NH₂·HCl–⌬(NH₂·HCl) | 46 | >300 | 450 |

Table 1-1 — Continued

| Substrate compound | Yield (%) | Melting point (°C) | λmax in water (nm) |
|---|---|---|---|
| 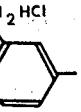 Y—⟨NH₂·HCl⟩—NH₂·HCl | 50 | >300 | 453 |
| X—⟨⟩—N(CH₃)₂·HCl | 54 | 175–177 | 452 |
| —⟨⟩—N(CH₃)₂·HCl | 57 | 148–151 | 454 |
| X—⟨OH⟩—N(CH₃)₂ | 60 | 246–247 | 458 |
| Y—⟨OH⟩—N(CH₃)₂ | 57 | 220–222 | 460 |
| X—⟨OH, CH₃⟩ | 76 | 233–236 | 330 |
| X—naphthyl | 30 | 205–207 | 374 |
| Y—naphthyl | 23 | 175–177 | 372 |

Table 1-1 — Continued

| Substrate compound | Yield (%) | Melting point (°C) | λmax in water (nm) |
|---|---|---|---|
| Z—naphthyl | 15 | 180–185 | 370 |
| X—2-naphthol | 73 | 233–235 | 485 |
| Y—2-naphthol | 50 | 236–237 | 484 |
| X—1-naphthol | 88 | >300 | 480 |
| Y—1-naphthol | 90 | >300 | 480 |
| X—2,6-dihydroxynaphthalene | 76 | 275–276 | 472 |
| Y—2,6-dihydroxynaphthalene | 80 | 244–245 | 475 |

Table 1-1—Continued

| Substrate compound | Yield (%) | Melting point (°C) | λmax in water (nm) |
|---|---|---|---|
| HO-[naphthalene with X at position, OH at other] | 77 | >300 | 490 |
| HO-[naphthalene with Y, OH] | 80 | >300 | 486 |
| X-[naphthalene with OH, COOH] | 84 | 250–257 | 512 |
| Y-[naphthalene with OH, COOH] | 84 | 235–240 | 500 |
| X-[naphthalene]-NH$_2$·HCl | 85 | 215–217 | 470 |
| Y-[naphthalene]-NH$_2$·HCl | 80 | 198–200 | 478 |

Table 1-1—Continued

| Substrate compound | Yield (%) | Melting point (°C) | λmax in water (nm) |
|---|---|---|---|
| [1-phenyl-3-methyl-pyrazolone with X—HC substituent] | 90 | 153–155 | 390 |
| X-[naphthol with CH$_3$, OH] | 85 | >300 | 480 |

Table 1-2

$$X' = \text{[4-(CH}_2\text{NH}_2 \cdot \tfrac{1}{2}\text{H}_2\text{SO}_4\text{)-phenyl-N=N–]}$$

$$Y' = \text{[3-(CH}_2\text{NH}_2 \cdot \tfrac{1}{2}\text{H}_2\text{SO}_4\text{)-phenyl-N=N–]}$$

| Substrate compound | Yield (%) | Melting point (°C) | λmax in water (nm) |
|---|---|---|---|
| Y'-[benzene with OH, OH] | 47 | >300 | 374 |
| X'-[benzene with NH$_2$, NH$_2$]·H$_2$SO$_4$ | 52 | >300 | 450 |

Table 1-1 — Continued

| Substrate compound | Yield (%) | Melting point (°C) | λmax in water (nm) |
|---|---|---|---|
| 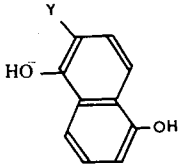 | 72 | >300 | 426 |

The aminomethylphenylazopyrazolone derivatives which may be used as substrates in the present invention include the following compounds.

4-(4'-Aminomethylphenylazo)-1-phenyl-3-methyl-5-pyrazolone hydrochloride 4-(3'-Aminomethylphenylazo)-1-phenyl-3-methyl-5-pyrazolone hydrochloride 4-(2'-Aminomethylphenylazo)-1-phenyl-3-methyl-5-pyrazolone hydrochloride 4-(4'-Aminomethylphenylazo)-1-cyclohexyl-3-propyl-5-pyrazolone hydrochloride 4-(3'-Aminomethylphenylazo)-1-cyclohexyl-3-propyl-5-pyrazolone hydrochloride 4-(2'-Aminomethylphenylazo)-1-cyclohexyl-3-propyl-5-pyrazolone hydrochloride 4-(4'-Aminomethylphenylazo)-1-tolyl-3-cyclopentyl-5-pyrazolone hydrochloride 4-(3'-Aminomethylphenylazo)-1-tolyl-3-cyclopentyl-5-pyrazolone hydrochloride 4-(2'-Aminomethylphenylazo)-1-tolyl-3-cyclopentyl-5-pyrazolone hydrochloride 4-(4'-Aminomethylphenylazo)-1-styryl-3-nitromethyl-5-pyrazolone hydrochloride 4-(3'-Aminomethylphenylazo)-1-styryl-3-nitromethyl-5-pyrazolone hydrochloride 4-(2'-Aminomethylphenylazo)-1-styryl-3-nitromethyl-5-pyrazolone hydrochloride.

In an embodiment of the present invention, the enzymatic reaction is carried out by incubating a definite amount of the substrate solution prepared by dissolving an excess of benzylaminoazo derivative (I) as the substrate in a buffer solution having a pH of 6.0 to 8.0, preferably 7.0 to 7.2, together with a definite amount of the MAO-containing organism sample at a temperature of 10° to 45°C, preferably 25° to 37°C. for 0.3 hour to 3.0 hours, preferably for 0.5 to 2.0 hours. Since with the progress of the enzymatic reaction the reaction mixture changes in color with the formation of a benzaldehydeazo derivative (II), termination of the reaction can be recognized. Following to the incubation, an organic inert solvent in which only the benzaldehydeazo derivative (II) is soluble, but which is immiscible with water is added to the reaction mixture to extract the benzaldehydeazo derivative. As the inert solvents, organic solvents such as aliphatic hydrocarbons, aromatic hydrocarbons, esters, ethers and ketones e.g., hexane, cyclohexane, decaline, xylene, ethyl acetate, isopropyl acetate, ethyl ether and methyl butyl ketone are used effectively.

It is preferable to separate rapidly the solvent layer in which the benzaldehydeazo derivative (II) has been extracted and the aqueous layer, for example, by means of a centrifugal method in which the addition of a neutral salt, for example, sodium sulfate, or sodium dodecylsulfate facilitates the separation.

It is also possible to add an acid as an enzymatic activity ceasing agent to the reaction mixture after the enzymatic reaction, if necessary, to make the reaction fluid acidic and then to extract the benzaldehydeazo derivative (II) with said solvent. In this case, inorganic acids such as, for example, hydrochloric acid and perchloric acid or organic acids such as, for example, trichloroacetic acid and acetic acid can be used effectively as an enzymatic activity ceasing agent and their kinds are not specifically restricted.

The absorbance of the solvent-extracted solution containing the extracted benzaldehydeazo derivative (II) formed is determined at the spectrophotometrically optimum wave length in visible region characteristic of said benzaldehydeazo derivative (II) and the absorbance obtained is designated as Absorbance (A). In said determination of the absorbance, a solvent-extracted solution obtained by adding a definite volume of distilled water to the substrate solution instead of the organism sample and treating in the same manner as in the case of said organism sample is used as a control.

On the other hand, as a standard a definite volume of an aqueous solution of the benzaldehydeazo derivative having the prescribed concentration is added to the substrate solution instead of the organism sample and the resulting solution is treated in the same manner as in the case of said organism sample to give a solvent-extracted solution and the absorbance thereof is determined in the same fashion, and the absorbance is designated as Absorbance (B).

Here, the amount of the benzaldehydeazo derivative (II) formed, M(μg), is calculated as follows:

$$M (\mu g) = \begin{bmatrix} \text{The amount } (\mu g) \\ \text{of the} \\ \text{benzaldehydeazo} \\ \text{derivative (II)} \\ \text{contained in the} \\ \text{standard solution used} \end{bmatrix} \times \frac{\text{Absorbance } (A)}{\text{Absorbance } (B)}$$

In the present invention, the enzymatic activity of MAO represents the number of moles (mμ mole = milli-micromoles) of the benzaldehydeazo derivative (II) formed per ml of the serum sample per hour of the enzymatic reaction time and this value is shown as enzymatic unit (Eu).

$$Eu = \frac{M}{\begin{bmatrix} \text{Molecular weight of the} \\ \text{benzaldehydeazo derivative (II)} \end{bmatrix}} \times \frac{1}{\begin{bmatrix} \text{The amount (ml) of} \\ \text{the serum sample used} \end{bmatrix}} \times \frac{1}{\begin{bmatrix} \text{Reaction} \\ \text{time (hr.)} \end{bmatrix}}$$

According to the present invention, the benzylaminoazo derivatives (I) have higher adaptability as a substrate in the reaction with MAO than the prior art substrate and hence it is possible to shorten the time required for the enzymatic reaction as compared with the previous method. Further, a less amount of the organism sample, that is, only one-fourth of the amount required in the previous method is required and hence an amount of the organism sample the volume of blood collected from patients may be smaller and, therefore, it is possible to reduce distress of the patients.

Comparison of the present method and the prior art method is shown in the following Table 2.

Table 2

| Substrate compound | Previous method | The present method | |
|---|---|---|---|
| Condition | Benzylamine | 1-(4'-Amino-methyl-phenylazo)-2-naphthol hydrochloride | 4-(4'-Amino-methylphenyl-azo)-1-phenyl-3-methyl-5-pyrazolone hydrochloride |
| Volume of serum used (ml) | 1.2 (including 0.6 ml for a blank test) | 0.3 | 0.3 |
| Incubation time with shaking at 37°C. (hours) | 3 | 2 | 2 |
| Wave length at which the determination was made (nm) | 242 | 480 | 395 |
| Enzymatic activity of MAO (Eu) | 25 | 36.5 | 36.5 |

The present invention is explained in details by way of examples hereinbelow, but the present invention is not restricted to the examples.

REFERENTIAL EXAMPLE 1

0.2 Grams of 4-aminobenzylamine dihydrochloride was dissolved in a solution of 4 ml of hydrochloric acid in 50 ml of water and a solution of 0.7 g of sodium nitrite in 50 ml of water was added thereto under cooling. After the completion of the diazotization reaction, a solution comprising 1.2 g of p-cresol, 4.0 g of sodium hydroxide and 30 ml of water was added thereto and the reaction mixture was stirred for 1 hour. The reaction mixture was acidified with hydrochloric acid to precipitate crystals and the precipitated crystals were filtered, dried and recrystallized from methanol. Thus, there was obtained 2.1 g (yield: 76 percent) of the crystals of 2-(4'-aminomethylphenylazo)-p-cresol hydrochloride having a melting point of 233° to 236°C (with decomposition).

| Elementary analysis for $C_{14}H_{15}N_3O \cdot HCl$ | | | |
|---|---|---|---|
| Calculated: | C 60.48, | H 5.76, | N 15.12 |
| Found: | C 60.22, | H 5.85, | N 15.31 |
| λmax | 330 nm (in water) | | |

REFERENTIAL EXAMPLE 2

18.0 Grams of 4-aminobenzylamine dihydrochloride was dissolved in a solution of 36 ml of hydrochloric acid in 100 ml of water and a solution of 6.3 g of sodium nitrite in 50 ml of water was added thereto with stirring under cooling. After the completion of the diazotization reaction, a solution comprising 13.0 g of β-naphthol, 36 g of sodium hydroxide and 300 ml of water was added thereto. The reaction mixture was acidified with hydrochloric acid to precipitate the crystals and the precipitated crystals were filtered, dried and recrystallized from methanol. Thus, there was obtained 21 g (yield: 73 percent) of orange crystals of 1-(4'-aminomethylphenylazo)-β-naphthol hydrochloride having a melting point of 233° to 235°C. (with decomposition).

| Elementary analysis for $C_{17}H_{15}ON_3 \cdot HCl$: | | | |
|---|---|---|---|
| Calculated: | C: 65.10, | H: 5.11, | N: 13.08 |
| Found: | C: 64.59, | H: 4.86, | N: 13.15 |
| λmax | 485 nm (in water) | | |

REFERENTIAL EXAMPLE 3

5.0 Grams of N-(3'-aminobenzyl)phthalimide was dissolved in a solution of 6.0 g of hydrochloric acid in 300 ml of water and a solution of 1.4 g of sodium nitrite in 50 ml of water was added thereto with stirring under cooling. After the completion of the diazotization reaction, a solution comprising 2.6 g of N,N-dimethylaniline, 5 ml of hydrochloric acid and 50 ml of water was added thereto and reaction mixture was stirred for 1 hour while adding an aqueous solution of sodium acetate thereto in such a way that the reaction mixture maintained a yellowish green color. Finally, an aqueous solution of sodium carbonate was added to make the reaction mixture alkaline and the reaction mixture was filtered to give 7.4 g (yield: 97 percent) of yellow crystals of N-(p-N,N-dimethylaminobenzeneazo-3-benzyl)-phthalimide.

The crystals thus obtained as above were heated to reflux together with diluted alcohol and hydrazine hydrate and again heated to reflux after the addition of hydrochloric acid. After the reaction, the reaction mixture was concentrated under a reduced pressure and water was added thereto and the mixture was filtered to give phthal hydrazide. An aqueous solution of sodium carbonate was added to the filtrate to bring the pH value thereof to 2 and then a soluble fraction was extracted with cyclohexane and removed. An aqueous solution of sodium carbonate was added to the isolated aqueous layer to bring the pH value thereof to 14 or higher and extracted with chloroform. The chloroform layer was dehydrated with anhydrous sodium sulfate and then concentrated under a reduced pressure. The residue was dissolved in acetone and hydrochloric acid was added hereto and the mixture was evaporated to dryness under a reduced pressure. There was obtained 3.5 g (yield: 57 percent) of bluish violet crystals of 4-(3'-aminomethylphenylazo) N,N-dimethylaniline dihydrochloride having a melting point of 144° to 145°C (with decomposition).

| Elementary analysis for $C_{15}H_{18}N_4 \cdot 2HCl$ | | | |
|---|---|---|---|
| Calculated: | C: 55.00, | H: 6.11, | N: 17.11 |
| Found: | C: 55.14, | H: 6.04, | N: 16.89 |
| λmax | 455 nm (in water) | | |

REFERENTIAL EXAMPLE 4

2.0 Grams of 4-aminobenzylamine dihydrochloride was dissolved in a solution of 4 ml of hydrochloric acid in 50 ml of water and a solution of 0.7 g of sodium nitrite in 50 ml of water was added thereto with stirring under cooling. After the completion of the diazotization reaction, said solution was poured into an aqueous solution comprising 1.9 g of 1-phenyl-3-methyl-5-pyrazolone, 2 g of sodium hydroxide and 50 ml of water. After the coupling reaction, the reaction mixture was made acidic with the addition of hydrochloric acid, and salted out to give crude crystals. When recrystallized from methanol there was obtained 3.4 g (yield: 90 percent) of yellowish orange crystals of 4-(4'-aminomethylphenylazo)-1-phenyl-3-methyl-5-pyrazolone having a melting point of 153° to 155°C.

Elementary analysis for $C_{17}H_{18}N_5OCl$

| | | | |
|---|---|---|---|
| Calculated: | C: 61.91, | H: 5.50, | N: 16.99 |
| Found: | C: 61.50, | H: 5.31, | N: 16.76 |
| λmax | 390 nm (in water) | | |

EXAMPLE 1

A substrate buffer solution was prepared by dissolving 1 mM of 1-(4'-aminomethylphenylazo)-2-naphthol hydrochloride as a substrate in a 0.1 M tris(-hydroxymethyl) aminomethane-HCl buffer solution. 2.0 Milliliters of the substrate buffer solution was placed in a centrifugal tube and warmed at 37°C for 3 minutes and then 0.3 ml of a serum sample was added thereto and the mixture was incubated in a thermostat vessel at 37°C for 2 hours. 4 Milliliters of cyclohexane was added thereto and the mixture was shaken and extracted in a vibro-mixer for 30 seconds and then subjected to centrifugation at 3,000 r.p.m. for 10 minutes and the upper layer (a solvent-extracted layer) was collected. In the procedure of separation, 10 mg of sodium sulfate was added to facilitate the separation of the extracted layer.

0.3 Milliliter of an aqueous solution of 1-(4'-benzaldehydeazo)-2-naphthol having a concentration of 50 μg/ml as a standard solution and 0.3 ml of distilled water as a control were placed in different centrifugal tubes, and they were treated in the some manner as in the case of serum sample to obtain the solvent-extracted layers.

The Absorbance (A) of the solvent-extracted layer obtained with the serum sample and the Absorbance (B) of the solvent-extracted layer obtained with the standard solution were measured at the coloring peak of 1-(4'-benzaldehydeazo)-2-naphthol, that is, at 480 nm, using the solvent-extracted layer obtained with distilled water as a control and the following results were obtained.

Absorbance (A) = 0.052, Absorbance (B) = 0.130

From these values the amount of 1-(4'-benzaldehydeazo)-2-naphthol formed by the action of MAO in the serum sample was calculated as follows:

$$M = \frac{50\ (\mu g)}{1\ (ml)} \times 0.3\ (ml) \times \frac{0.052}{0.130} = 6.0\ (\mu g)$$

And the enzymatic unit (Eu) of MAO in the serum sample was calculated as follows:

$$Eu = \frac{6.0\ (\mu g)}{276} \times \frac{1.0\ (ml)}{0.3\ (ml)} \times \frac{1}{2\ (hr.)} = 36.4$$

EXAMPLE 2

4-(4'Aminomethylphenylazo)-N,N-dimethylaniline dihydrochloride and 4-(4'-benzaldehydeazo)-N,N-dimethylaniline hydrochloride were used in place of 1-(4'-aminomethylphenylazo)-2-naphthol hydrochloride and 1-(4'-benzaldehydeazo)-2-naphthol, respectively, used in Example 1 and the reaction was carried out in the same manner as in Example 1. The absorbance was measured at the coloring peak of 4-(4'-benzaldehydeazo)-N,N-dimethylaniline hydrochloride, that is, at 430 nm.

Absorbance (A) = 0.050, Absorbance (B) = 0.125.

Therefore, the amount (M) of the benzaldehydeazo derivative formed by the action of MAO in the serum sample was calculated as follows:

$$M = \frac{50\ (\mu g)}{1\ (ml)} \times 0.3\ (ml) \times \frac{0.050}{0.125} = 6.0\ (\mu g)$$

And, hence, the enzymatic unit (Eu) of MAO in the serum sample was calculated as follows:

$$Eu = \frac{6.0\ (\mu g)}{289.5} \times \frac{1.0\ (ml)}{0.3\ (ml)} \times \frac{1}{2\ (hr.)} = 34.5$$

EXAMPLE 3 n-Hexane was used in place of cyclohexane used as a solvent in Example 1 and the reaction was carried out in the same way as in Example 1. The results obtained were as follows:

Absorbance (A) = 0.052, Absorbance (B) = 0.130
The enzymatic unit (Eu) of MAO in the serum sample was calculated as follows:

Eu = 36.4

EXAMPLE 4

A substrate buffer solution and a standard solution were prepared in the same way as in Example 1. 2.0 Milliliters of the substrate buffer solution was placed in a centrifugal tube and warmed at 37°C for 3 minutes and then 0.3 ml of the serum sample was added thereto and the mixture was incubated in a thermostat vessel at 37°C for 2 hours. The reaction mixture was made acidic by the addition of 1 drop of hydrochloric acid as an enzymatic activity ceasing agent and 4 ml of cyclohexane was added thereto as a solvent and thereafter the operation was carried out in the same manner as in Example 1. The results obtained were as follows:

Absorbance (A) = 0.052, Absorbance (B) = 0.130
The enzymatic unit (Eu) of MAO in the serum sample is calculated as follows:

Eu = 36.5

EXAMPLE 5

Perchloric acid was used in place of hydrochloric acid used as an enzymatic activity ceasing agent in Example 4 and thereafter the operation was carried out in the same manner as in Example 4. The results obtained were as follows:

Absorbance (A) = 0.052, Absorbance (B) = 0.130
The enzymatic unit (Eu) of MAO in the serum sample was calculated as follows:

Eu = 36.4

EXAMPLE 6

0.5 Milliliter of a serum sample was added to 1.0 ml of a substrate solution of 1-(3'-aminomethylphenylazo)-2-naphthol hydrochloride in a 0.1 M tris(-hydroxymethyl) aminomethane-HCl (pH 7.2) buffer solution (having a concentration of 1 mM) and the mixture was warmed at 37°C for 60 minutes and then it was acidified by the addition of 1 drop of perchloric acid and extracted with shaking with 5 ml of cyclohexane. After extraction, the absorbance at 480 nm was measured and the MAO activity was determined from a comparison with the standard solution containing 1-(3'-benzaldehydeazo)-2-naphthol (50 µg/ml). The results obtained were as follows:

Absorbance (A) = 0.030, Absorbance (B) = 0.120
Therefore, the amount (M) of 1-(3'-benzaldehydeazo)-2-naphthol formed by the action of MAO in the serum sample was calculated as follows:

$$M = \frac{50 \ (\mu g)}{1 \ (ml)} \times 0.5 \ (ml) \times \frac{0.030}{0.120} \times 6.25 \ (\mu g)$$

And the enzymatic unit (Eu) of MAO in the serum sample was calculated as follows:

$$Eu = \frac{6.25 \ (\mu g)}{276} \times \frac{1.0 \ (ml)}{0.5 \ (ml)} = 45.4$$

EXAMPLE 7

0.5 Milliliter of a serum sample was added to 1 ml of a substrate solution (with a concentration of 0.01 g/ml) prepared by dissolving 4-(4'-aminomethylphenylazo)-1-phenyl-3-methyl-5-pyrazolone in a 0.1 M tris(hydroxymethyl)aminomethane-HCl buffer solution and the mixture was warmed and reacted at 37°C for 60 minutes and then 1 drop of perchloric acid was added thereto to make the reaction mixture acidic, and extracted with shaking with 4.0 ml of cyclohexane. After extraction, the absorbance of the extract was measured at 395 nm. The MAO activity was determined from a comparison with the absorbance of a standard solution containing 50 µg/ml of 4-(4'-benzaldehydeazo)-1-phenyl-3-methyl-5-pyrazolone. The results obtained were as follows:

Absorbance (A) = 0.095, Absorbance (B) = 0.215
Therefore, the amount (M) of 4-(4'-benzaldehydeazo)-1-phenyl-3-methyl-5-pyrazolone formed by the action of MAO in the serum sample was calculated as follows:

$$M = \frac{50 \ (\mu g)}{1 \ (ml)} \times 0.5 \ (ml) \times \frac{0.095}{0.215} = 11.0 \ (\mu g)$$

And the enzymatic unit (Eu) of MAO in the serum sample was calculated as follows:

$$Eu = \frac{11.0 \ (\mu g)}{343} \times \frac{1.0 \ (ml)}{0.5 \ (ml)} = 64$$

EXAMPLE 8

A variety of substrates and the corresponding benzaldehydeazo derivatives were used as standard substances in place of 1-(3'-aminomethylphenylazo)-2-naphthol hydrochloride and 1-(3'-benzaldehydeazo)-2-naphthol used in Example 6 and the absorbance was measured at the wave length in visible region shown in the following Table 3 and MAO activity was determined.

Table 3-1

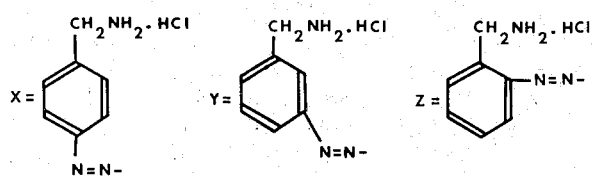

| Substrate compound | Wave length of coloring peak of the corresponding benzaldehydeazo derivative (nm) | MAO activity (Eu) |
|---|---|---|
| X—⟨OH⟩—OH (OH, OH) | 380 | 42.5 |
| Y—⟨OH⟩—OH (OH, OH) | 375 | 43.2 |
| Z—⟨OH⟩—OH (OH, OH) | 320 | 46.5 |
| X—⟨OH⟩ (CH₃, OH, CH₃) | 360 | 46.3 |

Table 3-1—Continued

| Substrate compound | Wave length of coloring peak of the corresponding benzaldehydeazo derivative (nm) | MAO activity (Eu) |
|---|---|---|
| Y—C₆H₂(CH₃)₂—OH (2,6-dimethyl) | 350 | 47.2 |
| X—C₆H₃(NH₂·HCl)(NH₂·HCl) | 460 | 42.8 |
| Y—C₆H₃(NH₂·HCl)(NH₂·HCl) | 450 | 43.5 |
| Y—C₆H₄—N(CH₃)₂·HCl | 460 | 44.2 |
| X—C₆H₃(OH)—N(CH₃)₂ | 460 | 46.4 |
| Y—C₆H₃(OH)—N(CH₃)₂ | 450 | 47.2 |
| X—C₆H₃(OH)(CH₃) | 350 | 44.5 |
| X—naphthyl (1-) | 375 | 46.0 |
| Y—naphthyl | 370 | 45.0 |
| Z—naphthyl | 365 | 44.0 |
| X—naphthol (4-OH) | 470 | 42.3 |
| Y—naphthol (4-OH) | 475 | 42.9 |
| X—dihydroxynaphthalene (2,6-(OH)₂) | 475 | 46.5 |
| Y—dihydroxynaphthalene (2,6-(OH)₂) | 475 | 45.4 |
| X—naphthalene-1,4-diol (with HO-) | 490 | 42.8 |

Table 3-1—Continued

| Substrate compound | Wave length of coloring peak of the corresponding benzaldehydeazo derivative (nm) | MAO activity (Eu) |
|---|---|---|
| ![naphthalene with Y, HO, OH] | 490 | 43.8 |
| ![HO, COOH, X naphthalene] | 510 | 46.5 |
| ![HO, COOH, Y naphthalene] | 500 | 47.2 |
| ![X naphthalene NH₂·HCl] | 470 | 44.5 |
| ![Y naphthalene NH₂·HCl] | 480 | 45.8 |
| ![X naphthalene CH₃ OH] | 472 | 40.0 |

Table 3-2

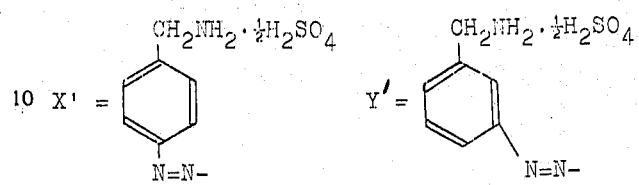

$$X' = \underset{N=N-}{\underset{|}{\bigcirc}}-CH_2NH_2\cdot\tfrac{1}{2}H_2SO_4 \qquad Y' = \underset{N=N-}{\underset{|}{\bigcirc}}-CH_2NH_2\cdot\tfrac{1}{2}H_2SO_4$$

| Substrate compound | Wave length of coloring peak of the corresponding benzaldehydeazo derivative (nm) | MAO activity (Eu) |
|---|---|---|
| X'—⟨OH, OH⟩ | 375 | 43.2 |
| X'—⟨NH₂, NH₂⟩·H₂SO₄ | 460 | 43.9 |
| Y' naphthalene HO, OH | 490 | 41.5 |

EXAMPLE 9

1-(4'-Aminomethylphenylazo)-2-naphthol (free form) was used in place of 1-(4'-aminomethylphenylazo)-2-naphthol hydrochloride used in Example 1 and the reaction and the operation were carried out in the same manner as in Example 1. The results obtained were as follows:

Absorbance (A) = 0.052, Absorbance (B) = 0.130
The enzymatic unit (Eu) of MAO in the serum sample was calculated as follows:

Eu = 36.4

What is claimed is:
1. A method for determining the enzymatic activity of monoamine oxidase contained in an organism sample through measurement of visible absorption spectrum and which comprises
   a. reacting (i) a substrate solution containing a benzylaminoazo compound, or acid addition salt thereof, of the formula:

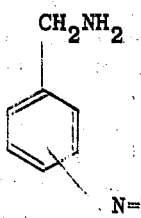

wherein R is phenyl which is unsubstituted or substituted with hydroxy, lower alkyl or di-lower alkyl amino; naphthyl which is unsubstituted or substituted with hydroxy, carboxy, amino or alkyl; or pyrazolone of the formula

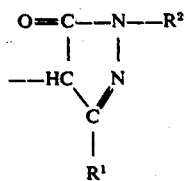

wherein $R^1$ is lower alkyl, lower cycloalkyl or nitro (lower alkyl) and $R^2$ is phenyl, lower cycloalkyl, tolyl or styryl with (ii) monoamine oxidase present in said organism sample to form a benzaldehydeazo derivative of the formula:

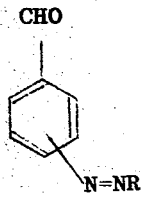

wherein R is as defined above.
  b. separating said benzaldehydeazo derivative from the reaction mixture;
  c. measuring the optical absorbance of the formed benzaldehydeazo derivative at a wavelength in the visible absorption spectrum and
  d. thereafter comparing this absorbance to the absorbance of a known quantity of benzaldehyde derivative to determine the amount of derivative formed in (a) and relating this amount to the volume of sample and reaction time, to thereby determine the activity of the monoamine oxidase.

2. A method as claimed in claim 1, wherein the benzylaminoazo derivative is 1-(4'-aminomethylphenylazo)-2-naphthol hydrochloride.

3. A method as claimed in claim 1, wherein the benzylaminoazo derivative is 4-(4'-aminomethylphenylazo)-N,N-dimethylaniline dihydrochloride.

4. A method as claimed in claim 1, wherein the benzylaminoazo derivative is 1-(3'-aminomethylphenylazo)-2-naphthol hydrochloride.

5. A method as claimed in claim 1, wherein the benzylaminoazo derivative is 1-(4'-aminomethylphenylazo)-2,4-dihydroxybenzene hydrochloride.

6. A method as claimed in claim 1, wherein the benzylaminoazo derivative is 1-(3'-aminomethylphenylazo)-2,4-dihydroxybenzene hydrochloride.

7. A method as claimed in claim 1, wherein the benzylaminoazo derivative is 1-(2'-aminomethylphenylazo)-2,4-dihydroxybenzene hydrochloride.

8. A method as claimed in claim 1, wherein the benzylaminoazo derivative is 4-(4'-aminomethylphenylazo)-2,6-dimethylphenol hydrochloride.

9. A method as claimed in claim 1, wherein the benzylaminoazo derivative is 4-(3'-aminomethylphenylazo)-2,6-dimethylphenol hydrochloride.

10. A method as claimed in claim 1, wherein the benzylaminoazo derivative is 4-(4'-aminomethylphenylazo)-3-aminoaniline trihydrochloride.

11. A method as claimed in claim 1, wherein the benzylaminoazo derivative is 4-(3'-aminomethylphenylazo)-3-aminoaniline trihydrochloride.

12. A method as claimed in claim 1, wherein the benzylaminoazo derivative is 4-(3'-aminomethylphenylazo)-N,N-dimethylaniline dihydrochloride.

13. A method as claimed in claim 1, wherein the benzylaminoazo derivative is 4-(4'-aminomethylphenylazo)-3-hydroxy-N,N-dimethylaniline hydrochloride.

14. A method as claimed in claim 1, wherein the benzylaminoazo derivative is 4-(3'-aminomethylphenylazo)-3-hydroxy-N,N-dimethylaniline hydrochloride.

15. A method as claimed in claim 1, wherein the benzylaminoazo derivative is 2-(4'-aminomethylphenylazo)-p-cresol hydrochloride.

16. A method as claimed in claim 1, wherein the benzylaminoazo derivative is 1-(4'-aminomethylphenylazo)-naphthalene hydrochloride.

17. A method as claimed in claim 1, wherein the benzylaminoazo derivative is 1-(3'-aminomethylphenylazo)-naphthalene hydrochloride.

18. A method as claimed in claim 1, wherein the benzylaminoazo derivative is 1-(2'-aminomethylphenylazo)-naphthalene hydrochloride.

19. A method as claimed in claim 1, wherein the benzylaminoazo derivative is 4-(4'-aminomethylphenylazo)-1-naphthol hydrochloride.

20. A method as claimed in claim 1, wherein the benzylaminoazo derivative is 4-(3'-aminomethylphenylazo)-1-naphthol hydrochloride.

21. A method as claimed in claim 1, wherein the benzylaminoazo derivative is 1-(4'-aminomethylphenylazo)-2,7-dihydroxynaphthalene hydrochloride.

22. A method as claimed in claim 1 wherein the benzylaminoazo derivative is 1-(3'-aminomethylphenylazo)-2,7-dihydroxynaphthalene hydrochloride.

23. A method as claimed in claim 1, wherein the benzylaminoazo derivative is 2-(4'-aminomethylphenylazo)-1,5-dihydroxynaphthalene hydrochloride.

24. A method as claimed in claim 1, wherein the benzylaminoazo derivative is 2-(3'-aminomethylphenylazo)-1,5-dihydroxynaphthalene hydrochloride.

25. A method as claimed in claim 1, wherein the benzylaminoazo derivative is 1-(4'-aminomethylphenylazo)- 2-hydroxy-3-naphthoic acid hydrochloride.

26. A method as claimed in claim 1, wherein the benzylaminoazo derivative is 1-(3'-aminomethylphenylazo)-2-hydroxy-3-naphthoic acid hydrochloride.

27. A method as claimed in claim 1, wherein the benzylaminoazo derivative is 1-(4'-aminomethylphenylazo)-4-aminonaphthalene dihydrochloride.

28. A method as claimed in claim 1, wherein the benzylaminoazo derivative is 1-(3'-aminomethylphenylazo)-4-aminonaphthalene dihydrochloride.

29. A method as claimed in claim 1, wherein the benzylaminoazo derivative is 4-(4'-aminomethylphenylazo)-1-phenyl-3-methyl-5-pyrazolone hydrochloride.

30. A method as claimed in claim 1, wherein the reaction is carried out at a pH ranging from 6.0 – 8.0 and at a temperature ranging from 10°– 45°C.

31. A method as claimed in claim 1, wherein the separation of the benzaldehydeazo derivative is carried out by extracting with an organic solvent selected from the group consisting of n-hexane, cyclohexane, decaline, xylene, ethyl acetate, isopropyl acetate, ethyl ether and methyl butyl ketone.

32. A method as claimed in claim 31, wherein the extraction is carried out in the presence of a neutral salt.

33. A method as claimed in claim 31, wherein the extraction is carried out in the presence of an acid.

34. A method as claimed in claim 1, wherein the optical determination of benzaldehydeazo derivative is carried out in an organic solvent.

* * * * *